United States Patent [19]
Coran et al.

[11] Patent Number: 6,066,697
[45] Date of Patent: May 23, 2000

[54] THERMOPLASTIC COMPOSITIONS CONTAINING ELASTOMERS AND FLUORINE CONTAINING THERMOPLASTICS

[75] Inventors: Aubert Y. Coran; Oansuk Chung, both of Akron, Ohio

[73] Assignee: The University of Akron, Akron, Ohio

[21] Appl. No.: 09/140,127

[22] Filed: Aug. 25, 1998

[51] Int. Cl.[7] ..................................................... C08F 8/00
[52] U.S. Cl. ...................... 525/193; 525/133; 525/194; 525/199; 524/314
[58] Field of Search .................... 525/133, 193, 525/194, 199; 524/314

[56] References Cited

U.S. PATENT DOCUMENTS

| | | | |
|---|---|---|---|
| 4,062,830 | 12/1977 | Ceccato et al. | 260/47 UP |
| 4,104,210 | 8/1978 | Coran et al. | 260/4 R |
| 4,259,463 | 3/1981 | Moggi et al. | 525/331 |
| 4,299,931 | 11/1981 | Coran et al. | 525/95 |
| 4,332,918 | 6/1982 | Fukahori et al. | 525/259 |
| 4,355,139 | 10/1982 | Coran et al. | 525/133 |
| 4,530,971 | 7/1985 | Geri et al. | 525/199 |
| 4,675,362 | 6/1987 | Miyabayashi et al. | 525/208 |
| 4,758,618 | 7/1988 | Ito et al. | 524/430 |
| 4,988,548 | 1/1991 | Takemura et al. | 428/368 |
| 5,130,201 | 7/1992 | Yoshimura et al. | 428/416 |
| 5,210,151 | 5/1993 | Rempel et al. | 525/338 |
| 5,275,887 | 1/1994 | Johnson et al. | 428/422 |
| 5,395,886 | 3/1995 | Caporiccio et al. | 525/102 |
| 5,527,858 | 6/1996 | Blong et al. | 525/187 |
| 5,580,916 | 12/1996 | Traverso et al. | 524/281 |
| 5,708,132 | 1/1998 | Grimm | 528/487 |

FOREIGN PATENT DOCUMENTS

| | | |
|---|---|---|
| 301949 | 2/1989 | European Pat. Off. . |
| 714944 | 6/1996 | European Pat. Off. . |
| 854173 | 7/1998 | European Pat. Off. . |

*Primary Examiner*—David Buttner
*Attorney, Agent, or Firm*—Renner, Kenner, Greive, Bobak, Taylor & Weber

[57] ABSTRACT

A thermoplastic vulcanizate prepared by dynamically vulcanizing a rubber within a blend that comprises the rubber, a fluorine containing thermoplastic, and a vulcanizing agent; wherein the rubber is selected from nitrile rubber, hydrogenated nitrile rubber, amino-functionalized nitrile rubber, acrylonitrile-isoprene rubber, and mixtures thereof.

29 Claims, 1 Drawing Sheet

THERMOPLASTIC COMPOSITIONS CONTAINING ELASTOMERS AND FLUORINE CONTAINING THERMOPLASTICS

TECHNICAL FIELD

The present invention is directed toward polymeric blends containing at least one elastomer and at least one fluorine containing thermoplastic. In a particular embodiment of the present invention, the blend is a thermoplastic vulcanizate containing particles of a nitrile rubber dispersed within a polyvinylidene fluoride matrix.

BACKGROUND OF THE INVENTION

Thermoplastic vulcanizates are well known in the art. They offer a substantial economic advantage because they have many of the properties of an elastomer, but yet are processable as thermoplastics.

Nitrile rubber, which is oil resistant, has advantageously been used as the elastomer of choice in thermoplastic vulcanizate products that are useful in oil rich environments, such as many automotive products. For example, U.S. Pat. No. 4,104,210 teaches thermoplastic vulcanizates including high unsaturation diene rubber particles, e.g., nitrile rubber particles, dispersed throughout a crystalline thermoplastic polyolefin resin, e.g. polyethylene.

Likewise U.S. Pat. No. 4,355,139 teaches compatibilized blends of nitrile rubber, thermoplastic olefin polymers, and a compatibilizing amount of a copolymer comprising at least one molecular segment each of nitrile rubber and olefin polymer. Upon dynamic vulcanization, compositions comprising fifty parts or more of cured nitrile rubber per one hundred parts by weight of olefin polymer are elastomeric. These compositions are fairly resistant to swelling in hot oil.

Besides being resistant to swelling in hot oil, many applications for elastomeric articles also require that the elastomeric compositions from which they are made are less oil permeable. In other words, although some elastomeric compositions are oil resistant, they may allow for the passage of oil therethrough.

Accordingly, there is a need in the art to develop elastomeric materials, preferably thermoplastic vulcanizates, that are resistant to oil, and have improved resistance to hot oil transport therethrough.

SUMMARY OF INVENTION

It is therefore, an object of the present invention to provide a new and useful thermoplastic vulcanizate.

It is another object of the present invention to provide a thermoplastic vulcanizate having improved high temperature stability.

It is yet another object of the present invention to produce a thermoplastic elastomers having improved resistance to hot-oil swelling.

It is still a further object of the present invention to produce a new thermoplastic elastomer with improved resistance to hot-oil transport therethrough.

It is yet another object of the present invention to produce thermoplastic elastomeric compositions having improved ultimate strength.

At least one or more of the foregoing objects, together with the advantages thereof over the known art relating to rubber/thermoplastic blends, shall become apparent from the specification that follows, and are accomplished by the invention as hereinafter described and claimed.

In general the present invention provides a thermoplastic vulcanizate prepared by dynamically vulcanizing a rubber within a blend that comprises the rubber, a fluorine containing thermoplastic, and a vulcanizing agent, wherein the rubber is selected from nitrile rubber, hydrogenated nitrile rubber, amino-functionalized nitrile rubber, acrylonitrile-isoprene rubber, and mixtures thereof.

The present invention also provides a polymeric blend comprising a rubber selected from the group including nitrile rubber, hydrogenated nitrile rubber, amino-functionalized nitrile rubber, acrylonitrile-isoprene rubber, and mixtures thereof, a fluorine containing thermoplastic, and a compatibilizing reagent selected from the group including poly(methyl vinyl ketone) and poly (vinylpyrrolidone), wherein the rubber is in the form of fine particles dispersed throughout the fluorine containing thermoplastic.

The present invention further provides a thermoplastic vulcanizate comprising from about 30 to about 80 parts by weight of vulcanized rubber particles, wherein the particles have a number-average particle size of less than about 25 micrometers, and from about 20 to about 70 parts by weight of a polyvinylidene fluoride, wherein the rubber and said polyvinylidene fluoride total about 100 parts by weight, and wherein the rubber particles are dispersed within a matrix of the polyvinylidene fluoride.

The present invention still further provides a thermoplastic vulcanizate comprising from about 30 to about 80 parts by weight of vulcanized rubber particles, wherein the particles have a number-average particle size of less than about 25 micrometers, from about 20 to about 70 parts by weight of a polyvinylidene fluoride, wherein the rubber and the polyvinylidene fluoride total about 100 parts by weight, and from about 0.2 to about 20 parts by weight, per one hundred parts by weight of rubber and polyvinylidene fluoride combined, of a compatibilizing agent selected from the group including poly(methyl vinyl ketone) and poly (vinylpyrrolidone).

PREFERRED EMBODIMENT FOR CARRYING OUT THE INVENTION

Figure 1:
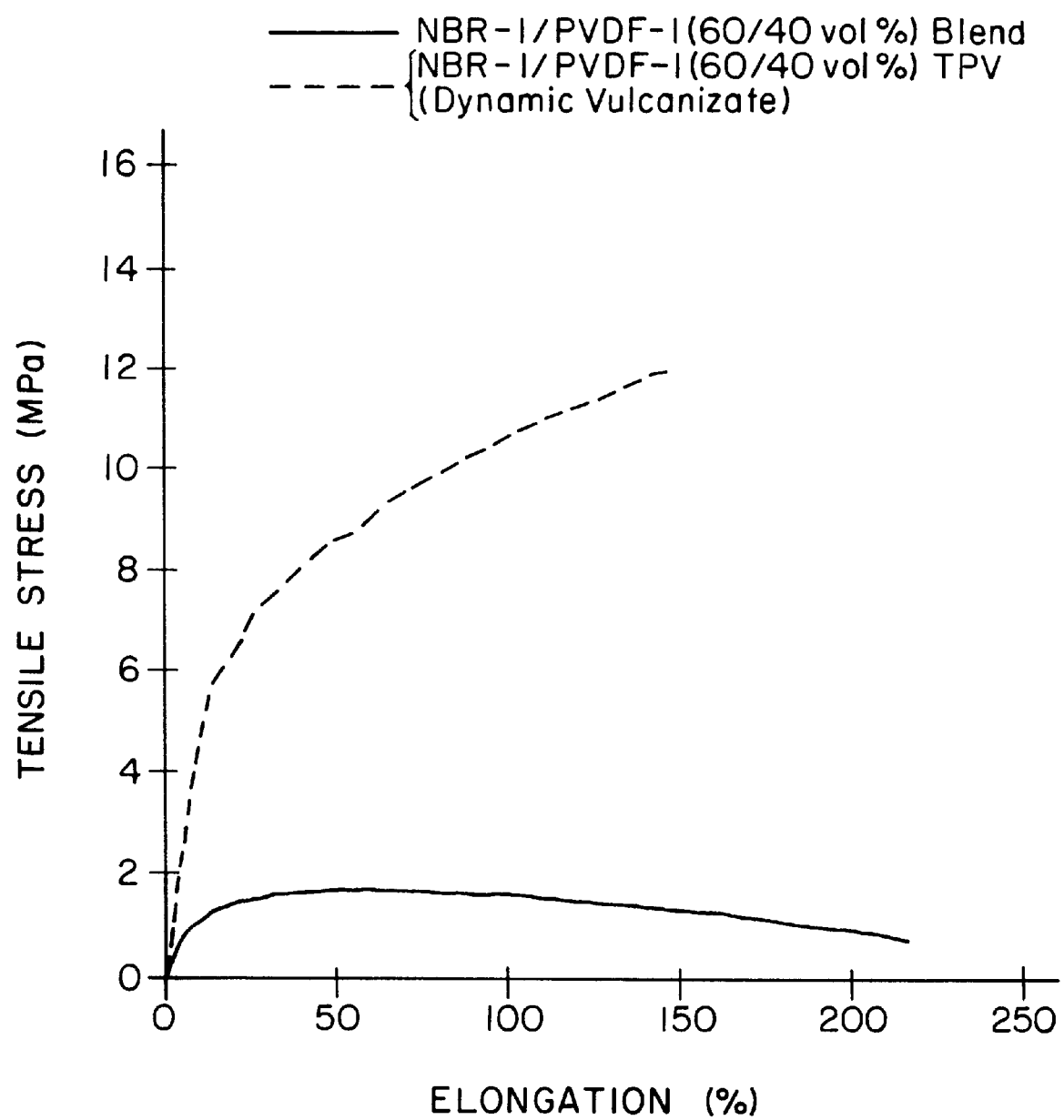
FIG. 1 is a graphical plot of elongation versus tensile stress for two rubbery blends containing 60 percent by volume nitrile rubber, and 40 percent by volume polyvinylidene fluoride, wherein one of the blends has been dynamically vulcanized with a phenolic resin curative.

It has now been found that improved blends of rubber and thermoplastic materials can be prepared by employing a fluorine containing thermoplastic. In one embodiment, the rubber within the blend is vulcanized, and the resulting composition has been found to have good mechanical properties, excellent hot-oil resistance, and resistance to the passage of hot-oil therethrough. A compatibilizing agent can optionally be used to improve the mechanical properties of the resulting thermoplastic vulcanizate. Even when the rubber is not vulcanized, the presence of a compatibilizing agent can improve the overall properties of the blend.

In one preferred embodiment of the present invention, where the rubber is vulcanized, the compositions include a blend of a rubber and a fluorine containing thermoplastic, which may simply be referred to as the thermoplastic. Preferably, compositions of this embodiment will contain sufficient amounts of rubber to form rubbery compositions of matter. The skilled artisan will understand that rubbery compositions of matter are those that have ultimate elongations greater than 100 percent, and that quickly retract 150 percent or less of their original length within about 10 minutes after being stretched to 200 percent of their original length and held at 200 percent of their original length for about 10 minutes. Accordingly, the compositions of the present invention should comprise at least about 25 parts by weight rubber, preferably at least about 35 parts by weight rubber, even more preferably at least about 45 parts by weight rubber, and still more preferably at least about 50 parts by weight rubber per 100 parts by weight of the rubber and thermoplastic combined. Although rubbery in nature, the elastomer within the blend should be well dispersed within a matrix of the fluorine-containing thermoplastic so as to ensure processability.

More particularly, the compositions of the present invention preferably should include from about 30 to about 80 parts by weight of a rubber, and from about 70 to about 20 parts by weight of a fluorine-containing thermoplastic, per 100 parts by weight of rubber and thermoplastic combined. More preferably, the compositions of the present invention should include from about 35 to about 70 parts by weight of a rubber, and about 65 to about 30 parts by weight of a fluorine-containing thermoplastic; even more preferably the compositions should include from about 40 to about 70 parts by weight of a rubber, and from about 60 to about 30 parts by weight of a fluorine-containing thermoplastic; and still more preferably should contain from about 50 to about 70 parts by weight of a rubber, and from about 50 to about 30 parts by weight of a fluorine-containing thermoplastic; wherein the foregoing comprise 100 parts by weight of rubber and thermoplastic combined.

As noted, the rubber within this preferred embodiment in vulcanized. Preferably, this vulcanization is achieved by dynamic vulcanization to form a thermoplastic vulcanizate. As the skilled artisan will appreciate, thermoplastic vulcanizates are characterized by the presence of finely divided and well dispersed rubber particles within a plastic matrix. These compositions exhibit the characteristics and mechanical properties of rubber, and yet are capable of being processed as thermoplastics.

Elastomers that are useful in the practice of the present invention include nitrile rubbers (NBR), hydrogenated nitrile rubbers, amino-functionalized nitrile rubbers, acrylonitrile-isoprene rubbers and mixtures thereof. Of course, the skilled artisan will recognize that mixtures thereof simply refers to a mixture of the foregoing rubbers, which are compatible. Nitrile rubbers are a copolymers of 1,3-butadiene and acrylonitrile, and generally have an acrylonitrile content of about 15 to about 50 percent by weight. For further information respecting nitrile rubber, reference can be made to Kirk-Othmer, Encyclopedia of Chemical Technology, Ed. 2, 1982, Vol. 8, page 184 et seq., and Vol. 20, page 365 et seq., which are hereby expressly incorporated by reference. Nitrile rubber is commercially available from many sources including The Goodyear Tire and Rubber Company of Akron, Ohio under the tradename CHEMIGUM®, or the B. F. Goodrich Chemical Group of Cleveland, Ohio under the tradename HYCAR®.

Hydrogenated nitrile rubber is also well known in the art as set forth in *W. Hoffman Rubber Technology Handbook*, page 76, Oxford University Press, 1989. Hydrogenated nitrile rubber is commonly abbreviated HBNR. It has been commercially available from sources including Polysar under the tradename Tornac®, from Nippon Zeon of New York, N.Y. under the tradename Zetpol® and from Bayer Corp. of Akron, Ohio under the tradename Therban®.

Amino-functionalized nitrile rubbers are likewise well known in the art and generally include those nitrile rubbers that contain at least one pendent reactive amino group, and may therefore be referred to as pendent-amino elastomers. These pendent-amino elastomers are fully disclosed in U.S. Pat. Nos. 3,658,769, 3,767,628, 4,155,955, and 4,354,007, which are all hereby expressly incorporated by reference, as well as our own copending U.S. patent application Ser. No.08/689,455, now U.S. Pat. No. 5,936,038 which is likewise expressly incorporated herein by reference. Amino functionalized nitrile rubbers are commercially available from many sources including The Goodyear Tire and Rubber company under the tradename CHEMIGUM® HR 662, CHEMIGUM® HR 665, CHEMIGUM HR 967, and CHEMIGUM HR 765 A.

Useful fluorine containing thermoplastics include both fluorine containing polymers and copolymers. In a preferred embodiment of the present invention, the fluorine containing thermoplastic is polyvinylidene fluoride. Polyvinylidene fluoride is available from Elf Atochem of Philadelphia, Pa. under the tradenames FORAFLOM® or KYNAR®, or from Solvay Polymers of Houston, Tex. under the tradename SOLEF®. Another useful fluorine containing thermoplastic includes poly tri-fluoro ethylene.

Although most commercially available polyvinylidene fluorides can be employed in the practice of the present invention, preferred polyvinylidene fluoride resins include those having a melt index at 232° C. and 3.8 kg load between about 1.0 and about 50, more preferably between about 3.0 and about 35, and even more preferably between about 5.0 and about 20. Also, it is especially preferred that the polyvinylidene fluoride is crystalline.

With specific regard to dynamic vulcanization, it should be understood that dynamic vulcanization is the crosslinking of an elastomeric polymer in its blend with a non-vulcanizing polymer while both polymers are undergoing molten-state mixing or masticating, such mixing or masticating being continued at least until vulcanization is essentially complete. The rubber and the fluorine containing thermoplastic, which is a non-vulcanizing polymer, are mixed at a temperature sufficient to soften the thermoplastic, non-vulcanizing polymer or, more commonly, at a temperature above its melting point if the thermoplastic, non-vulcanizing polymer is crystalline at ordinary temperatures. After dynamic vulcanization, one obtains a homogeneous mixture, wherein the rubber is in the form of small dispersed particles essentially of an average particle size smaller than about 50 μm, preferably of an average particle size smaller than about 25 μm, more preferably of an average size smaller than about 10 μm or less, and still more preferably of an average particle size of 5 μm or less. After the thermoplastic, non-vulcanizing polymer and elastomer are intimately mixed in the molten state, a vulcanizing amount of the curative is added. Heating and masticating at vulcanization temperature are generally adequate to complete the vulcanization reaction in a few minutes or less, but if shorter vulcanization times are desired, higher temperatures may be used. To obtain thermoplastic vulcanizates, it is important that mixing continues without interruption until vulcanization occurs. If appreciable curing is allowed after mixing has stopped, a thermoset unprocessable vulcanizate may be obtained.

For example, when the CHEMIGUM® HR elastomer is vulcanized while intimately mixed with the KYNAR® polyvinylidene fluoride in the molten-state, vulcanization typically occurs within the range from about 160° C. to about 230° C., preferably in the range from about 170° C. to about 215° C., and more preferably in the range from about 180° C. to about 200° C. Masticating and heating the mixture within these temperature ranges will typically produce a sufficiently vulcanized product within 0.5 to about 10 minutes. Of course, the vulcanization time can be reduced by increasing the temperature.

In fact, it has been unexpectedly discovered that the mechanical properties, including ultimate tensile strength and ultimate elongation, are greatly improved by effective dynamic vulcanization. For example, FIG. 1 shows that the tensile strength and ultimate elongation of a thermoplastic vulcanizate containing nitrile rubber and polyvinylidene fluoride are far superior to those of a simple unvulcanized blend of the same nitrile rubber and polyvinylidene fluoride.

Vulcanization can be effected with various curing agents and/or vulcanizing agents that are known in the art. These include, for example, phenolic resin curatives, sulfur and sulfur-donor cure systems, peroxide cure systems, quinone-type cure systems, accelerated sulfur, m-phenylenebismaleamide, and organic peroxides and other free-radical generators. For further information respecting vulcanization, reference can be made to *Vulcanization* by Aubert Y. Coran in the *Encyclopedia of Polymer Science and Engineering, Second Edition*, Volume 17, which is hereby expressly incorporated by reference.

The skilled artisan will readily be able to determine a sufficient or effective amount of vulcanizing agent to be employed without undue calculation or experimentation. In one preferred embodiment of the present invention, a vulcanizing amount of the phenolic-resin curative is added to a blend of nitrile rubber and PVDF to obtain the thermoplastic vulcanizate of the present invention. Generally, a vulcanizing amount of phenolic-resin curative comprises about 1 to about 20 parts by weight per hundred parts by weight rubber. The vulcanizing amount of phenolic-resin curative preferably comprises about 3 to about 16 parts by weight per hundred parts by weight rubber, and more preferably comprises about 4 to about 12 parts by weight per hundred parts by weight rubber. The amount of vulcanizing agent is sufficient to at least partially vulcanize the rubber. Preferably, the rubber is completely vulcanized. Completely vulcanized means that the state of cure is typical of that of the conventional vulcanizate of the rubber.

The phenolic-resin curative useful in the present invention can be referred to as resole resins, which are made by condensation of alkyl substituted phenols or unsubstituted phenols with aldehydes, preferably formaldehydes, in an alkaline medium or by condensation of bi-functional phenoldialcohols. The alkyl substituents of the alkyl substituted phenols typically contain 1 to about 10 carbon atoms. Dimethoylol phenols or phenolic resins, substituted in para-positions with alkyl groups containing 1 to about 10 carbon atoms are preferred. These phenolic curatives are typically thermosetting resins and will be referred to as phenolic-resin curatives for purposes of this disclosure.

Phenolic-resins useful in the practice of the present invention include those available from Schenectady International of Schenectady, N.Y., under the tradenames SP-1044, SP-1045, SP-1055, and SP-1056. It should be appreciated that the SP-1044 and SP-1045 products are alkylphenol-formaldehyde resins, and that the SP-1055 and SP-1056 products are bromomethylated alkylphenol-formaldehyde resins. The SP-1044 and SP-1045 resins are believed to be essentially free of halogen substituents or residual halogen compounds. By essentially free of halogen substituents, it is meant that the synthesis of the resin provides for a non-halogenated resin; and by essentially free of residual halogen compounds, it is meant that the synthesis of the resin provides for a composition that may only contain trace amounts of halogen containing compounds.

In one embodiment of the present invention, where pendent-amino elastomers are employed, those phenolic resins that are essentially free of substituent halogen atoms or compounds are preferably employed. Our co-pending application, U.S. Ser. No. 08/689,455, now U.S. Pat. No. 5,936,038 is incorporated herein by reference in this regard. As discussed in this co-pending application, where pendent-amino elastomers are vulcanized with phenolic resins such as SP-1044 or SP-1045, an activation catalyst is advantageously not needed to effect the cure.

In this embodiment, sufficient cross-linking of the pendent-amino elastomer is achieved when about 1 to about 20 parts by weight per hundred parts by weight rubber (phr) of the curing agent of the present invention is used with the pendent-amino elastomer. Preferably, about 2 to about 6 phr, and even more preferably about 4 to about 12 phr, curing agent is used with the pendent-amino elastomer. Vulcanization occurs within a reasonable time, without the use of an activation catalyst, when the elastomer, mixed with the curing agent, is heated, preferable to a temperature of about 120 to about 240, and preferably more from about 150 to about 200.

An example of a preferred phenolic-resin curative is defined according to the general formula (V).

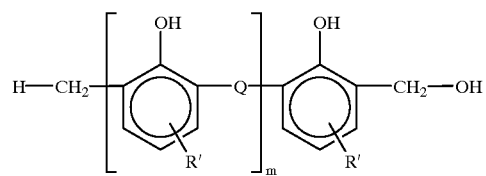

(V)

wherein Q is a divalent radical selected from the group consisting of —CH$_2$—, —CH$_2$—O—CH$_2$—; m is zero or a positive integer from 1 to 20 and R' is an organic radical. Preferably, Q is the divalent radical —CH$_2$—O—CH$_2$—, m is zero or a positive integer from 1 to 10, and R' is an organic radical having less than 20 carbon atoms. Still more preferably m is zero or a positive integer from 1 to 5 and R' is an organic radical having between 4 and 12 carbon atoms.

Although pendent-amino elastomers can be vulcanized in the absence of an activation catalyst, the curing of conventional unsaturated elastomers, i.e., those without a pendent amine, with phenolic resins, including both halogenated and non-halogenated phenolic resins, requires the presence of an activation catalyst to effect an efficient cure. For example, U.S. Pat. No. 4,774,288, which is hereby incorporated by reference, employs resin systems to cure elastomers having low levels of unsaturation. This cure or vulcanization is carried out in the presence of an activation catalyst to achieve proper cross-linking within a reasonable time. Activation catalysts typically include metal oxide catalysts and Lewis-acid catalysts. The metal oxide commonly used includes, but is not limited to, zinc oxide, and the Lewis-acid catalyst commonly include, but are not limited to, acid-acting metal halides such as boron trifluoride, stannous chloride, zinc chloride, titanium trichloride, titanium tetrachloride, aluminum chloride, ferric chloride, ferric bromide, zinc bromide, aluminum bromide, or complexes thereof.

The sulfur and sulfur-containing cure systems used in the present invention can include one or more sulfur curing accelerators. Suitable accelerators commonly employed include, for example, thiuram monosulfides and disulfides such as tetramethylthiuram monosulfide (TMTMS), tetrabutylthiuram disulfide thiocarbamates, tetramethylthiuram disulfide thiocarbamates, tetraethylthiuram monosulfide (TETMS), dipentamethylenethiuram hexasulfide (DPTH) and the like; benzothiazole sulfenamides such as N-oxydiethylene-2-benzothiazole sulfenamide, N-cyclohexyl-2-benzothiazole sulfenamide, N,N-diisopropyl-2-benzothiazole sulfenamide, N-tert-butyl-2-benzothiazole sulfenamide (TBBS) and the like; 2-mercaptoimidazoline, N,N-diphenylguanidine, N,N-di-(2-methylphenyl)-guanidine, thiazole accelerators such as 2-mercaptobenzothiazole, 2-(morpholinodithio) benzothiazole disulfide, zinc 2-mercaptobenzothiazole and the like; and dithiocarbamate accelerators such as zinc dibutyldithiocarbamate, zinc diethyldithiocarbamate and zinc dimethyldithiocarbamate.

It should be appreciated that the foregoing list is not exclusive, and that other vulcanizing agents known in the art to be effective in the curing of rubber employed in the polymer blend may also be utilized. For a list of additional vulcanizing agents, see The Vanderbilt Rubber Handbook, RT Vanderbilt Co., Norwalk Conn. 06855 (1990). It should also be understood that these sulfur donor-type accelerators may be used in place of the elemental sulfur or in conjunction therewith. Suitable amounts of sulfur to be used in the cure system can be readily determined by those skilled in the art, and generally ranges from about 0.5 to 1.0 phr, while the amount of accelerator can also be readily determined by those skilled in the art and generally ranges from about 0.3 to about 2.0 phr.

Accelerators generally require a metal oxide, i.e., zinc oxide, for cure activation in most all types of rubbers. Zinc oxide is almost always the metal oxide of choice because of its effectiveness and lack of toxicity. The amount of zinc oxide may vary, but about 1 to about 10 parts by weight in the formulation have been found to give the desired effect. Also, in order to initiate the vulcanization process, a small amount (generally about 1 to 8 parts by weight) of stearic acid is present in the composition. Using heat, both zinc oxide and stearic acid act as cure activators in the presence of sulfur, one or more accelerators and unsaturated rubber help to promote the formation of sulfur crosslinks during the vulcanization process. Some of the initial chemical reactions which take place during the early stages of the vulcanization process include reacting zinc oxide with stearic acid to form salts of even greater vulcanization activity. Zinc oxide itself acts as a cure activator or vulcanization promoter. In addition to its use as a curing component, the sulfur component of the present invention may also be used in conjunction with zinc oxide to improve the heat aging resistance of the rubber composition.

Sulfur donor-type accelerators may be used in place of elemental sulfur or in conjunction with elemental sulfur if desired. Suitable amounts of sulfur and/or sulfur donor accelerators can be readily determined by those of ordinary skill in the art and generally range from about 0.5 to about 4 phr. The amounts of a sulfur donor accelerator can also be readily determined by those of ordinary skill in the art and generally range from about 1.5 to about 8 phr. Some examples of sulfur donor accelerators include; dimorpholino disulfide commonly referred to as Sulfasan R and various alkyl phenol disulfides which are commercially available from Pennwalt Corporation.

Examples of polysulfide activators for the quinone-type co-curing agents include calcium polysulfide, sodium polysulfide, as well as organic polysulfides having the general formula R—(S)$_x$—R, wherein R is a hydrocarbon group and x is a number from 2–4. Examples of organic polysulfides are disclosed in U.S. Pat. No. 2,619,481.

Additionally, a compatibilizing agent is preferably added to the preferred embodiment, especially where the rubbery composition is vulcanized. It has been found that the addition of certain compatibilizing agents unexpectedly improve the physical and mechanical properties of the resulting composition. Accordingly, the dynamically vulcanized rubbery blend of the present invention advantageously has an ultimate elongation that is greater than 150 percent, advantageously greater than 200 percent, more advantageously greater than 250 percent, and even more advantageously greater than 300 percent. It also has a tension set value that is advantageously less than 50 percent, even more advantageously less than 40 percent, and still more advantageously less than 30 percent. Still further, these novel compositions have been found to have an oil weight gain, as determined by ASTM #3 Oil Volume Swelling Test at 100° C., of less than 25 percent, advantageously less than 20 percent, more advantageously less than 15 percent, and even more advantageously less than 10 percent.

Useful compatibilizing agents include those compounds that, with a relatively small concentration, will improve the technological properties of the blend. These compounds are specific to the combination of materials in the blend, i.e., the rubber and the fluorine containing thermoplastic. Especially preferred compatibilizing agents include poly(methyl vinyl ketone), poly(vinylpyrrolidone). Preferably, the poly(methyl vinyl ketone) will have an average molecular weight between about 2,000 and about 500,000 daltons, and the poly(vinylpyrrolidone) will have an average molecular weight between about 2,000 and about 500,000 daltons. For purposes of this disclosure, molecular weight shall refer to number-average molecular weight ($M_n$), as determined by steric exclusion chromatography, which is also known as gel permeation chromatography (GPC).

When employed, the poly(vinylpyrrolidone) is used in an amount from about 0.2 to about 20 parts by weight based upon 100 parts by weight of the rubber and thermoplastic combined, preferably from about 0.5 to about 10 parts by weight, more preferably from about 1 to about 8 parts by weight, and still more preferably from about 2 to about 6 parts by weight based upon 100 parts by weight of the rubber and thermoplastic combined. When poly(vinylmethylketone) is employed, it is used in an amount from about 0.1 to about 20 parts by weight, preferably from about 0.5 to about 10 parts by weight, and more preferably from about 2 to about 6 parts by weight based upon 100 parts by weight of the rubber and thermoplastic combined.

The poly(vinylpyrrolidone) and poly(vinyl methyl ketone) compatibilizing agents, noted above, are commercially available and can be obtained from a variety of sources including the Aldrich Chemical Company of Milwaukee, Wis.

In another useful embodiment of the present invention, the compatibilizing agents described above are used where the blend is not vulcanized. The use of the compatibilizing agent will improve the interaction of the non-vulcanized rubber and the fluorine containing thermoplastic, and thereby improve the usefulness of the blend. Notably, the compatibilized blends of this embodiment need not be rubbery to be useful inasmuch as they can be used as impact resistant materials. These compositions preferably contain up to about 98 parts by weight, more preferably up to about 90 parts by weight, and even more preferably up to about 80 parts by weight of the fluorine containing thermoplastic based upon 100 parts by weight of the combined weight of the rubber and thermoplastic within the blend. Useful amounts of compatibilizing agent include from about 0.05 to about 0.1 parts by weight, preferably from about 0.2 to about 3 parts by weight, and more preferably from about 0.5 to about 5 parts by weight based upon 100 parts by weight of combined rubber and thermoplastic.

In addition to the polymer components and resin curing agent, the vulcanizable thermoplastic elastomeric composition of the present invention can further include reinforcing fillers, non-reinforcing fillers, antioxidants, stabilizers, rubber processing oils, lubricants, antiblocking agents, antistatic agents, waxes, coupling agents for the fillers, foaming agents, pigments, flame retardants, and other processing aids known in the art.

It should also be appreciated that methods other than dynamic vulcanization can be used to prepare the thermoplastic vulcanizate of the present invention. For example, the elastomer can be fully vulcanized in the absence of the thermoplastic resin, powered, and mixed with the thermoplastic resin, or thermoplastic elastomer, at a temperature above the melting or softening point of the thermoplastic resin, or thermoplastic elastomer. Furthermore, the thermoplastic vulcanizate can be achieved by simply blending the vulcanized elastomer with the thermoplastic resin in the molten state provided the rubber is ground to sufficiently small particles. Accordingly, the term "particulate blend" herein means a mixture of well dispersed small particles of cross-linked pendent-amino elastomer and thermoplastic resin or thermoplastic elastomer, typically of about 50 μm or less, preferably of about 25 μm or less, more preferably about 10 μm or less, and still more preferably about 5 μm or less.

The thermoplastic vulcanizates prepared according to the present invention are useful for producing parts by blow molding, extrusion, ejection molding, thermo-forming, and elasto-welding. Advantageously, the improved properties of the thermoplastic vulcanizates of the present invention make their use in oil resistant articles, such as hoses, tubing, diaphragms, motor mounts, protective bellows, spark plug boots, o-rings, gaskets, membranes, body plugs, etc. extremely useful and beneficial. Also, as noted hereinabove, those blends that contain a high concentration of thermoplastics are useful as impact resistant materials that can be employed in rigid articles such as handles, casings, doors, etc.

In order to demonstrate the practice of the present invention, the following examples have been prepared and tested as described in the General Experimentation Section disclosed hereinbelow. The examples should not, however, be viewed as limiting the scope of the invention. The claims will serve to define the invention.

GENERAL EXPERIMENTATION

In order to demonstrate the practice of the present invention, several compositions were prepared and tested for various physical properties. The tables below include the recipes for each composition that was prepared, as well as the physical properties that were obtained from each composition.

In general, the blends of the following examples were prepared by using a Brabender® mixer having an 85 ml volume and a cam-type rotor at 100 r.p.m. with a temperature set point of 180° C. The batch size employed was generally about 79 grams. Procedurally, the rubber, plastic, filler, plasticizing agent, and other non-curative ingredients were charged and the compositions were mixed until the plastic was melted—generally mixing was continued for about 1 minute thereafter. The melting temperature was determined by monitoring the mixing torque. At this point, the curative was added and mixing was continued until cure reaction was completed as determined by a leveling off of the mixing torque.

Example I

Here, blends of nitrile rubber and polyvinylidene fluoride were prepared. The amount of nitrile rubber and polyvinylidene fluoride that was employed was held constant while the amount of phenolic curative used was varied. Inasmuch as no phenolic curative was used in Recipe 1, a thermoplastic vulcanizate was not prepared in that case. The nitrile rubber that was used was obtained from The Goodyear Tire & Rubber Company under the tradename CHEMIGUM® HR 665; the polyvinylidene fluoride employed was obtained from Elf Atochem under the tradename KYNAR® 740; and the phenolic curative employed was obtained from Schenectady, Inc. under the tradename SP-1045. The polyvinylidene fluoride had a number-average molecular weight ($M_n$) of about 100,000, a weight-average molecular weight ($M_w$) of about 300,000, a melting point in the range from about 165° C. to about 170° C. and was from about 50 to about 55 percent crystalline.

TABLE I

|  | 1 | 2 | 3 | 4 | 5 | 6 | 7 | 8 | 9 | 10 |
| --- | --- | --- | --- | --- | --- | --- | --- | --- | --- | --- |
| Recipe |  |  |  |  |  |  |  |  |  |  |
| Poly(vinylidene fluoride) | 55.00 | 55.00 | 55.00 | 55.00 | 55.00 | 55.00 | 55.00 | 55.00 | 55.00 | 55.00 |
| Nitrile Rubber | 45.00 | 45.00 | 45.00 | 45.00 | 45.00 | 45.00 | 45.00 | 45.00 | 45.00 | 45.00 |
| Phenolic Curative | 0.00 | 0.45 | 0.90 | 1.35 | 1.80 | 2.25 | 2.70 | 3.15 | 3.60 | 4.05 |
| Properties |  |  |  |  |  |  |  |  |  |  |
| Ultimate Tensile Strength (MPa) | 7.950 | 11.57 | 12.47 | 13.09 | 14.04 | 14.88 | 13.62 | 14.13 | 13.73 | 14.51 |
| Ultimate Elongation (%) | 95 | 66 | 195 | 223 | 213 | 206 | 155 | 167 | 157 | 157 |
| Modulus @ 100 (MPa) | — | — | 11.00 | 10.94 | 11.62 | 12.29 | 12.02 | 12.37 | 12.25 | 12.86 |
| Compression Set 22 hrs @ 100°° C. (%) | 95.5 | 88.3 | 87 | 78.2 | 65.8 | 60.7 | 53.5 | 52.5 | 46.9 | 47.7 |
| Weight Gain 72 hrs @ 125°° C. (%) | 6.6 | 5.7 | 5.7 | 5.4 | 5.6 | 4.9 | 5.1 | 4.9 | 4.8 | 4.8 |
| Tension Set | — | — | 49.8 | 43.2 | 34.2 | 31.2 | 26.1 | 27.1 | 25.1 | 25.6 |
| Hardness (Shore D) | 30 | 41 | 43 | 43 | 42 | 42 | 42 | 43 | 42 | 43 |

Based upon the data of Table I, it is evident that vulcanization of the rubber within the blend improved the physical and mechanical properties of the blend. Also, it should be appreciated that inasmuch as the rubber employed contained pendent amino functionalities, no catalyst was employed.

Example II

The impact that various compatibilizers had on the thermoplastic vulcanizates was compared in Table II. The nitrile rubber that was employed was CHEMIGUM® HR 665, the polyvinylidene fluoride was KYNAR® 740, and the phenolic curative was SP-1045, as employed in Example I. The various compatabilizer candidates included poly(vinylmethylketone), poly(methylmethacrylate), poly(vinylpyrrolidone) ($M_n$ 10,000), poly(vinylpyrrolidone) ($M_n$ 29,000), poly(vinylpyrrolidone) ($M_n$ 55,000), poly(vinylpyrrolidone) ($M_n$ 130,000), and thermoplastic polyester elastomer. Except for the thermoplastic polyester elastomer, these compatibilizers were obtained from Aldrich Chemical. The thermoplastic polyester elastomer was a 4000 series Hytrel that was obtained from DuPont. Again, the compositions were dynamically vulcanized as set forth in Example 1.

TABLE II

| | 1 | 2 | 3 | 4 | 5 | 6 | 7 | 8 |
|---|---|---|---|---|---|---|---|---|
| Recipe | | | | | | | | |
| Poly(vinylidene fluoride) | 50 | 50 | 50 | 50 | 50 | 50 | 50 | 50 |
| Nitrile Rubber | 50 | 50 | 50 | 50 | 50 | 50 | 50 | 50 |
| Compatibilizer | — | — | — | — | — | — | — | — |
| Poly(vinylmethylketone) | — | 5 | — | — | — | — | — | — |
| Poly(methylmethacrylate) | — | — | 5 | — | — | — | — | — |
| Poly(vinylpyrrolidone)$^a$ | — | — | — | 5 | — | — | — | — |
| Poly(vinylpyrrolidone)$^b$ | — | — | — | — | 5 | — | — | — |
| Poly(vinylpyrrolidone)$^c$ | — | — | — | — | — | 5 | — | — |
| Poly(vinylpyrrolidone)$^d$ | — | — | — | — | — | — | 5 | — |
| Thermoplastic Polyester Elastomer | — | — | — | — | — | — | — | 5 |
| Phenolic Curative | 2.5 | 2.5 | 2.5 | 2.5 | 2.5 | 2.5 | 2.5 | 2.5 |
| Properties | | | | | | | | |
| Ultimate Tensile Strength (MPa) | 12.261 | 24.871 | 13.354 | 15.248 | 18.142 | 18.525 | 12.166 | 13.636 |
| Ultimate Elongation (%) | 139 | 444 | 122.3 | 249.3 | 345.3 | 335.5 | 87 | 153.3 |
| Modulus @ 100 (MPa) | 10.851 | 12.554 | 12.495 | 11.374 | 11.216 | 11.48 | — | 11.690 |
| Compression Set 22 hrs @ 100°° C. (%) | 52.8 | 65.8 | 48.2 | 58.1 | 54.1 | 54.5 | 5.46 | 47.3 |
| Weight Gain 72 hrs @ 125°° C. (%) | 5.8 | 2.4 | 5.8 | 4.8 | 4.7 | 4.5 | 5.3 | 6.4 |
| Tension Set | 22.1 | 43.7 | 22.6 | 32.2 | 34.7 | 34.7 | 26.6 | 24.1 |
| Hardness (Shore D) | 43 | 51 | 45 | 44 | 46 | 46 | 45 | 43 |

$^a M_n = 10,000$
$^b M_n = 29,000$
$^c M_n = 55,000$
$^d M_n = 130,000$

Ultimate elongation is indicative of the value and usefulness of the compatibilizer. Accordingly, it should be evident that the most useful compatibilizers included poly(vinylmethylketone), poly(vinylpyrrolidone) having an $M_n$ of 10,000, poly(vinylpyrrolidone) having an $M_n$ of 29,000, poly(vinylpyrrolidone) having an $M_n$ of 55,000, and the thermoplastic polyester elastomer. Inasmuch as the poly(methylmethacrylate) was not very useful, it was very surprising that the other compatibilizing agents were useful.

Example III

The impact that poly(vinylmethylketone) ($M_w$ 500,000), poly(vinylpyrrolidone) ($M_n$ 29,000), and thermoplastic polyester elastomer had on thermoplastic vulcanizates of the present invention was again examined. The amount of polyvinylidene fluoride, nitrile rubber, and phenolic curative were held constant. The nitrile rubber employed was CHEMIGUM® HR 665, the polyvinylidene fluoride employed was KYNAR®, and the phenolic curative employed was SP-1045 as set forth in Example I. The compatibilizing agents that were employed were obtained from Aldrich Chemical as set forth in Example II. Dynamic vulcanization was carried out as set forth in Example 1.

TABLE III

| | 1 | 2 | 3 | 4 | 5 |
|---|---|---|---|---|---|
| Recipe | | | | | |
| Poly(vinylidene fluoride) | 50 | 50 | 50 | 50 | 50 |
| Nitrile Rubber | 50 | 50 | 50 | 50 | 50 |
| Compatibilizer Poly(vinylmethylketone) | — | 1 | 2 | 4 | — |
| Poly(vinylpyrrolidone) | — | — | — | — | 4 |
| Phenolic Curative | 4 | 4 | 4 | 4 | 4 |
| Properties | | | | | |
| Ultimate Tensile Strength (MPa) | 13.862 | 16.58 | 18.578 | 23.879 | 19.157 |
| Ultimate Elongation (%) | 122.3 | 192 | 243 | 371.8 | 328 |
| Modulus @ 100 (MPa) | 12.85 | 12.552 | 12.628 | 12.809 | 11.38 |
| Compression Set 22 hrs @ 100°° C. (%) | 31.8 | 39.2 | 38.3 | 52.8 | 52.4 |
| Weight Gain 72 hrs @ 125°° C. (%) | 5.2 | 4.3 | 3.7 | 2.6 | 4.9 |
| Tension Set | 19.1 | 21.6 | 22.6 | 29.2 | 30.7 |
| Hardness (Shore D) | 40 | 42 | 42 | 45 | 41 |

Based on the data in Table III, it should be evident that increasing concentrations of poly(vinylmethylketone) continued to improved the properties of the blend.

Example IV

The impact that poly(vinylpyrrolidone) ($M_n$ 29,000), various thermoplastic polyester elastomers, and poly(ethyleneco-methyl acrylate-co-glycidyl methacrylate) had on the compositions was again examined. The amount of polyvinylidene fluoride, nitrile rubber, and phenolic curative was held constant. The nitrile rubber was CHEMIGUM® HR 665, the polyvinylidene fluoride employed was KYNAR®, and the phenolic curative employed was SP-1045. The poly(vinylpyrrolidone) was the same as that used in the foregoing Examples.

TABLE IV

| | 1 | 2 | 3 | 4 | 5 |
|---|---|---|---|---|---|
| Recipe | | | | | |
| Poly(vinylidene fluoride) | 50 | 50 | 50 | 50 | 50 |
| Nitrile Rubber | 50 | 50 | 50 | 50 | 50 |
| Compatibilizer Poly(vinylpyrrolidone) | — | 4 | 2 | — | — |
| Thermoplastic Polyester Elastomer | — | — | — | 4 | — |
| Poly(ethylene-co-methylacrylate-co-glycidyl methacrylate) | — | — | — | — | 4 |
| Phenolic Curative | 4 | 4 | 4 | 4 | 4 |
| Properties | | | | | |
| Ultimate Tensile Strength (MPa) | 12.26 | 19.74 | 18.34 | 8.52 | 12.40 |
| Ultimate Elongation (%) | 119.3 | 352.3 | 290 | 60.8 | 118.5 |
| Modulus @ 100 (MPa) | 11.62 | 11.44 | 11.64 | — | 11.58 |
| Compression Set 22 hrs @ 100°° C. (%) | 36.4 | 47.1 | 44 | 45.8 | 28.7 |
| Weight Gain 72 hrs @ 125°° C. (%) | 5.60 | 4.30 | 5.50 | 5.60 | 9.60 |
| Tension Set | 18.1 | 29.2 | 24.1 | — | — |
| Hardness (Shore D) | 42 | 43 | 43 | 40 | 39 |

As with the preceding Example, the data in Table IV indicates that increasing concentrations of poly (vinylpyrrolidone) continue to improve the properties of the blend.

Example V

The use of poly(vinylpyrrolidone) ($M_n$ 29,000) was explored using various other additives. Also, the amount of nitrile rubber employed was varied between 40 and 60 parts by weight based upon one hundred parts by weight of the total weight of the nitrile rubber and the polyvinylidene fluoride. The SP-1045 phenolic resin was employed as the curative where applicable, and the nitrile rubber employed was the same as used in Example I. Additional nitrile rubber was employed in one recipe that was obtained from B. F. Goodrich under the tradename Hycar 1300OXEL ATBN, which is a nitrile rubber that is amine terminated. The plasticizers included dioctyl adipate that was obtained from Aldrich Chemical, Santocizer® 2148, which was obtained from the Mansanto Company of St. Louis, Mo.

TABLE V

| | 1 | 2 | 3 | 4 | 5 |
|---|---|---|---|---|---|
| Recipe | | | | | |
| Poly(vinylidene fluoride) | 50 | 40 | 60 | 40 | 40 |
| Nitrile Rubber[a] | 50 | 60 | 40 | 60 | 60 |
| Nitrile Rubber[b] | — | — | — | — | — |
| Compatibilizer | — | — | — | — | — |
| Poly(vinylpyrrolidone) | 4 | 3.2 | 4.8 | 3.2 | 3.2 |
| Poly(methylmethacrylate) | — | — | — | — | — |
| 1,12-dichlorododecane Plasticizer | — | — | — | — | — |
| Dioctyl Adipate | — | — | — | 15 | — |
| Santocizer ®® 2148 | — | — | — | — | 15 |
| Phenolic Curative | 4 | 4.8 | 3.2 | 4.8 | 4.8 |
| Properties | | | | | |
| Ultimate Tensile Strength (MPa) | 20.15 | 16.35 | 22.77 | 9.55 | 10.22 |
| Ultimate Elongation (%) | 350 | 269 | 357 | 216 | 224 |
| Modulus @ 100 (MPa) | 11.17 | 8.94 | 14.83 | 5.80 | 6.36 |
| Compression Set 22 hrs @ 100°° C. (%) | 57.8 | 33.6 | 62.0 | 26.1 | 39.1 |
| Weight Gain 72 hrs @ 125°° C. (%) | 4.7 | 5.3 | 3.7 | −4.5 | −3.9 |
| Tension Set | 28.1 | 17.1 | 38.7 | 9.6 | 11.1 |
| Hardness (Shore D) | 46 | 35 | 52 | 27 | 30 |

[a]CHEMIGUM ® HR 665
[b]HYCAR ® 1300XEL ATBN

Based on the data in Table V, the addition of a plasticizer not only improved the softness of the blend, but also significantly reduced the amount of swelling in hot oil.

Example VI

The amount of nitrile rubber was varied from 30 parts by weight to 70 parts by weight based upon one hundred parts by weight of the combined nitrile rubber and poly (vinylpyrrolidene fluoride). The amount of compatabilizer, which was the poly(vinylpyrrolidone) ($M_n$ 29,000), and phenolic curative was likewise varied. Dioctyl adipate plasticizer was also employed in some recipes. The nitrile rubber that was employed was Nipol DN3635, which is not amino functionalized, and was obtained from Nippon Zeon Co., Ltd., of New York, N.Y. The phenolic curative was the same as that employed in the foregoing Examples. The peroxide curative was obtained from Aldrich Chemical under the tradename L-101, and the catalyst employed was conventional zinc oxide. The filler employed was conventional clay.

TABLE VI

|  | 1 | 2 | 3 | 4 | 5 | 6 | 7 | 8 | 9 | 10 |
|---|---|---|---|---|---|---|---|---|---|---|
| Recipe |  |  |  |  |  |  |  |  |  |  |
| Poly(vinylidene fluoride) | 30 | 50 | 70 | 40 | 60 | 40 | 60 | 40 | 60 | 50 |
| Nitrile Rubber | 70 | 50 | 30 | 60 | 40 | 60 | 40 | 60 | 40 | 50 |
| Compatibilizer Poly(vinylpyrrolidone) | 1.2 | 2 | 2.8 | 1.6 | 2.4 | 1.6 | 2.4 | 1.6 | 2.4 | 2 |
| Plasticizer Dioctyl Adipate | — | — | — | — | — | 30 | 20 | 54 | 30 | — |
| Phenolic Curative | 7 | 5 | 3 | 6 | 4 | 6 | 4 | 6 | 4 | — |
| Cure Catalyst | 2.8 | 2 | 1.2 | 2.4 | 1.6 | 2.4 | 1.6 | 2.4 | 1.6 | — |
| Peroxide Curative | — | — | — | — | — | — | — | — | — | 0.85 |
| Filler | — | — | — | — | — | — | — | 17.6 | 16 | — |
| Properties |  |  |  |  |  |  |  |  |  |  |
| Hardness (Shore A) | 76 | — | — | — | — | 70 | 90 | 62 | 87 | — |
| Ultimate Tensile Strength (MPa) | 14.119 | 20.869 | 27.77 | 16.94 | 25.35 | 5.24 | 12.475 | 2.1477 | 5.41 | 18.604 |
| Ultimate Elongation (%) | 252.5 | 333 | 430.8 | 276.8 | 412.5 | 122 | 222 | 44.8 | 43 | 187.8 |
| Modulus @ 100 (MPa) | 7.2361 | 12.423 | 18.745 | 9.624 | 14.805 | 4.651 | 9.4858 | — | — | 13.9253 |
| Compression Set 22 hrs @ $100°°$ C. (%) | 29.1 | 49.1 | 76.3 | 37.2 | 70.1 | 32.1 | 53.9 | 47.4 | 60 | 47.9 |
| Weight Gain 72 hrs @ $125°°$ C. (%) | 9.6 | 6.8 | 2.9 | 9.2 | 3.6 | −9.3 | −5.8 | −8.2 | −6.5 | 2.9 |
| Tension Set | 11.1 | 33.2 | 57.8 | 22.6 | 49.3 | 7.5 | 33.2 | — | — | 37.7 |
| Hardness (Shore D) | 32 | 48 | 62 | 43 | 53 | 19 | 39 | — | 31 | 46 |

Based on the foregoing data in Table VI, the use of poly(vinylpyrrolidone) as a compatibilizer in conjunction with the recipe that contained about 60 parts by weight poly(vinylidene fluoride), and about 40 parts by weight nitrile rubber, based on 100 parts by weight poly(vinylidene fluoride) and nitrile rubber combined, gave the best results. Also, 30 parts of plasticizer, per 100 parts of rubber and thermoplastic combined, is excessive. Furthermore, the NBR can be one that is not amino functionalized, and where this is the case, a cure activating catalyst is used for the phenolic curing agent. We note also that the organic peroxide was useful for dynamic vulcanization.

In view of the foregoing disclosure, it should now be apparent that the use of the fluorinated thermoplastic, as well as the composition as a whole, as described herein, will carry out the objects set forth hereinabove. It should be understood that any variations evident fall within the scope of the claimed invention and thus, the selection of specific component elements can be determined without departing from the spirit of the invention herein disclosed and described. In particular, elastomers according to the present invention are not necessarily limited to those having a pendent-amino group, nor is the vulcanizing agent limited to any one type. Thus, the scope of the invention shall include all modifications and variations that may fall within the scope of the attached claims.

What is claimed is:

1. A thermoplastic vulcanizate prepared by:
   dynamically vulcanizing a rubber within a blend that comprises the rubber, a fluorine containing thermoplastic, and a vulcanizing agent; wherein the rubber is selected from nitrile rubber, hydrogenated nitrile rubber, amino-functionalzed nitrile rubber, acrylonitrile-isoprene rubber, and mixtures thereof.

2. A thermoplastic vulcanizate, as set forth in claim 1, wherein said poly(methyl vinyl ketone) has a molecular weight between about 2,000 and about 500,000 daltons, and wherein said poly(vinylpyrrolidone) has a molecular weight between about 2,000 and about 500,000 daltons.

3. A thermoplastic vulcanizate, as set forth in claim 1, wherein the vulcanizing agent is selected from the group consisting of phenolic resins, accelerated sulfur, m-phenylenebismaleamide, and organic peroxides.

4. A thermoplastic vulcanizate, as set forth in claim 1, wherein the vulcanizing agent is methylphenolic resin and is present in an amount from about 1 to about 20 parts by weight, per 100 parts by weight rubber.

5. A thermoplastic vulcanizate, as set forth in claim 1, wherein the vulcanizing agent is an organic peroxide and is present in an amount from about 0.2 to about 5 parts by weight, per 100 parts by weight rubber.

6. A thermoplastic vulcanizate, as set forth in claim 1, wherein the fluorine containing thermoplastic is polyvinylidene fluoride.

7. A polymeric blend comprising:
   a rubber selected from the group consisting of nitrile rubber, hydrogenated nitrile rubber, amino-functionalized nitrile rubber, acrylonitrile-isoprene rubber, and mixtures thereof;
   a fluorine containing thermoplastic; and,
   a compatibilizing agent selected from the group consisting of poly(methyl vinyl ketone) and poly(vinylpyrrolidone), wherein said rubber is in the form of fine particles dispersed throughout said fluorine containing thermoplastic.

8. A polymeric blend, as set forth in claim 7, wherein said fine particles have a number-average particle size of less than about 10 micrometers.

9. A polymeric blend, as set forth in claim 8, wherein said fine particles have a number-average particle size of less than about 5 micrometers.

10. A polymeric blend, as set forth in claim 7, wherein said rubber particles are achieved by dynamic vulcanization.

11. A polymeric blend, as set forth in claim 7, further comprising from about 1 to about 60 parts by weight, per 100 parts by weight rubber, of a plasticizer.

12. A polymeric blend, as set forth in claim 7, wherein said poly(methyl vinyl ketone) has a molecular weight between about 2,000 and about 500,000 daltons, and wherein said poly(vinylpyrrolidone) has a molecular weight between about 2,000 and about 500,000 daltons.

13. A polymeric blend, as set forth in claim 7, wherein said fluorine containing thermoplastic is polyvinylidene fluoride.

14. A thermoplastic vulcanizate comprising:
   from about 30 to about 80 parts by weight of vulcanized rubber particles, wherein said particles have a number-average particle size of less than about 25 micrometers; and from about 20 to about 70 parts by weight of a polyvinylidene fluoride, wherein said rubber and said polyvinylidene fluoride total about 100 parts by weight, and wherein said rubber particles are dispersed within a matrix of said polyvinylidene fluoride.

15. A thermoplastic vulcanizate, as set forth in claim 14, where said rubber particles have a number-average particle size of less than about 10 micrometers.

16. A thermoplastic vulcanizate, as set forth in claim 15, where said rubber particles have a number-average particle size of less than about 5 micrometers.

17. A thermoplastic vulcanizate, as set forth in claim 14, where said vulcanized rubber particles are achieved by dynamic vulcanization.

18. A thermoplastic vulcanizate, as set forth in claim 14, further comprising from about 1 to abut 60 parts by weight, per 100 parts by weight rubber, of a plasticizer.

19. A thermoplastic vulcanizate, as set forth in claim 14, further comprising a compatibilizing agent selected from the group consisting of poly(methyl vinyl ketone) and poly(vinyl pyrrolidone), wherein said poly(methyl vinyl ketone) has a molecular weight between about 2,000 and about 500,000 daltons, and wherein said poly(vinylpyrrolidone) has a molecular weight between about 2,000 and about 500,000 daltons.

20. A thermoplastic vulcanizate, as set forth in claim 14, wherein said rubber particles are selected from the group consisting of nitrile rubber, hydrogenated nitrile rubber, amino-functionalized nitrile rubber, acrylonitrile-isoprene rubber, and mixtures thereof.

21. A thermoplastic vulcanizate, as set forth in claim 14, wherein said rubber particles are selected from the group consisting of nitrile rubber and amino-functionalized nitrile rubber.

22. A thermoplastic vulcanizate comprising:

from about 30 to about 80 parts by weight of vulcanized rubber particles, wherein said particles have a number-average particle size of less than about 25 micrometers;

from about 20 to about 70 parts by weight of a polyvinylidene fluoride, wherein said rubber and said polyvinylidene fluoride total about 100 parts by weight; and from about 0.2 to about 20 parts by weight, per one hundred parts by weight of rubber and polyvinylidene fluoride combined, of a compatibilizing agent selected from the group consisting of poly(methyl vinyl ketone) and poly(vinylpyrrolidone).

23. A thermoplastic vulcanizate, as set forth in claim 22, where said rubber particles have a number-average particle size of less than about 10 micrometers.

24. A thermoplastic vulcanizate, as set forth in claim 23, where said rubber particles have a number-average particle size of less than about 5 micrometers.

25. A thermoplastic vulcanizate, as set forth in claim 22, where said rubber particles are achieved by dynamic vulcanization.

26. A thermoplastic vulcanizate, as set forth in claim 22, further comprising from about 1 to abut 60 parts by weight, per 100 parts by weight rubber, of a plasticizer.

27. A thermoplastic vulcanizate, as set forth in claim 22, wherein said poly(methyl vinyl ketone) has a molecular weight between about 2,000 and about 500,000 daltons, and wherein said poly(vinylpyrrolidone) has a molecular weight between about 2,000 and about 500,000 daltons.

28. A thermoplastic vulcanizate, as set forth in claim 22, wherein said rubber is selected from the group consisting of nitrile rubber, hydrogenated nitrile rubber, amino-functionalized nitrile rubber, acrylonitrile-isoprene rubber, and mixtures thereof.

29. A thermoplastic vulcanizate, as set forth in claim 22, wherein said rubber is selected from the group consisting of nitrile rubber and amino-functionalized nitrile rubber.

* * * * *

UNITED STATES PATENT AND TRADEMARK OFFICE
CERTIFICATE OF CORRECTION

PATENT NO. : 6,066,697
DATED : May 23, 2000
INVENTOR(S) : Coran

It is certified that error appears in the above-identified patent and that said Letters Patent is hereby corrected as shown below:

Column 15,
Line 53, after the term "thermoplastic" please add -- a compatibilizing agent selected from the group consisting of poly(methyl vinyl ketone) and poly(vinyl pyrrolidone), --.

Column 17,
Line 5, after the term "fluoride" please add -- further comprising a compatibilizing agent selected from the group consisting of poly(methyl vinyl ketone) and poly(vinyl pyrrolidone) --.

Signed and Sealed this

Eleventh Day of March, 2003

JAMES E. ROGAN
*Director of the United States Patent and Trademark Office*